Nov. 5, 1957 E. MEYER 2,812,460
SALIENT POLE CONSTRUCTION AND MODE OF ATTACHMENT
TO ROTOR OF DYNAMO-ELECTRIC MACHINE
Filed Sept. 27, 1955
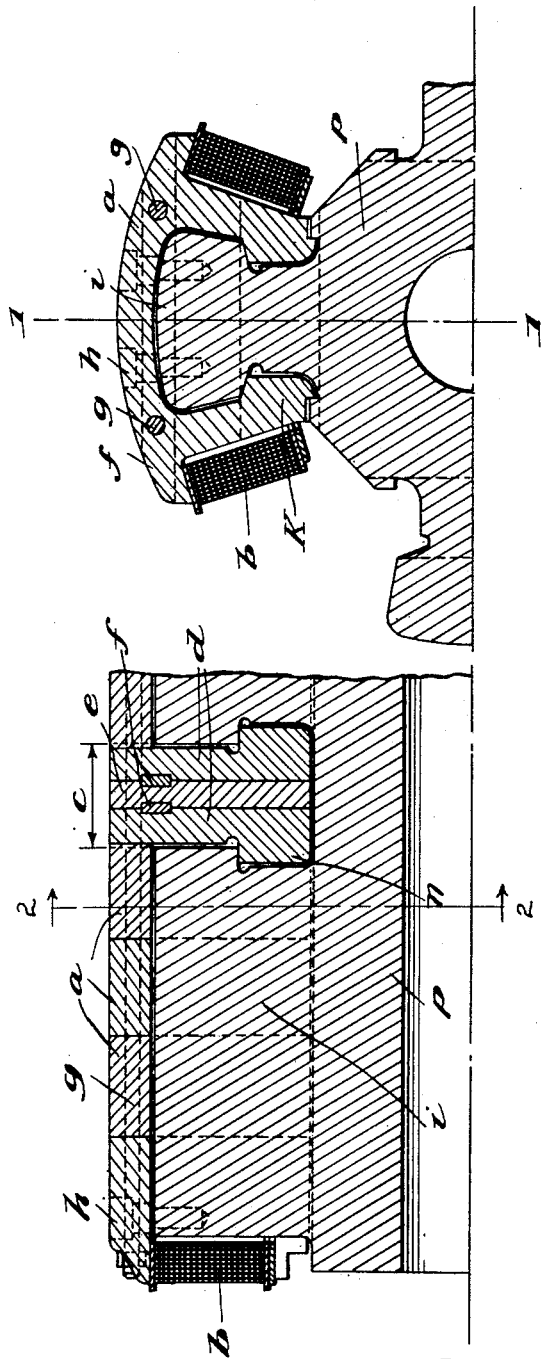
INVENTOR
Eugen Meyer.
BY Pierce, Scheffler & Parker
ATTORNEYS

United States Patent Office 2,812,460
Patented Nov. 5, 1957

2,812,460

SALIENT POLE CONSTRUCTION AND MODE OF ATTACHMENT TO ROTOR OF DYNAMO-ELECTRIC MACHINE

Eugen Meyer, Baden, Switzerland, assignor to Aktiengesellschaft, Brown, Boveri & Cie, Baden, Switzerland, a joint stock company Application September 27, 1955, Serial No. 536,801

Claims priority, application Switzerland October 1, 1954

2 Claims. (Cl. 310—218)

The present invention relates to dynamo-electric machines, more particularly to the rotors of such machines which have salient poles, and to an improved construction for such poles and mode of attaching the same to the body of the rotor.

For equipping the rotors of dynamo electric machines with salient poles it is known to use a claw construction where claws are provided at the core of the pole which engage longitudinally extending dovetailed grooves in the periphery of the rotor. For example, in four to eight pole, high power, synchronous machines, this type of fastening is mostly used. A defective pole coil can be changed quite rapidly since the individual poles can be easily removed from the rotor after loosening the safety screws. However, in machines having a high circumferential speed characteristic, this type of claw connection of the salient poles to the rotor body becomes so voluminous that the remaining part of the rotor body is stressed entirely too much for proper safety and hence another solution must be found. In most cases, the critical speed is too close to the maximum possible allowable excess speed for the machine.

It is also known to fasten the salient pole shoes to pole cores cast on the rotor body. In this construction no difficulties are generally encountered with regard to the stresses produced in the body of the rotor or with regard to a critical maximum speed but here the difficulties arise from the very high stresses produced in the pole shoes themselves and the associated fastening screws. Exchanging a pole coil is also very troublesome and time-consuming since all screws of a pole must be removed and inserted again.

For high speed machines with salient poles, another so-called "cog construction" has been developed. With this arrangement the poles have a cog-like fastening device for the pole shoes, and the pole shoe sheet packs are inserted between plate-shaped lugs in the body of the pole and connected by means of continuous bars extending in a longitudinal direction of the rotor, i. e. in its axial direction. The centrifugal force of the front coil copper is absorbed by an anti-magnetic shrunk ring, which is provided on all pole coils, or by tie rods between the double coils. This construction is most expensive to manufacture since the poles are composed of a great many high-grade unit parts each of which has to be separately machined. Moreover, the shrunk rings at the front ends are made of very expensive material and represent also an obstacle for the entrance of air in the pole gaps. As far as double coils are provided, the arrangement is mechanically more unfavorable, and replacement of a defective coil is troublesome and time-consuming.

The principal object of the present invention is to provide an improved construction for the salient pole and mode of attaching the same to the rotor body. A claw type of attachment is included but it has none of the disadvantages inherent in the claw attachments known in the prior art. Moreover, the construction is highly suitable for use in high-speed machines.

A more particular object of the invention is to provide a salient pole construction for rotors wherein the rotor body is provided with axially, i. e. longitudinally extending ribs which are undercut or otherwise arranged to make a sliding, interlocking fit with claw shaped poles and shoes that are sectionalized into short axial sections. Each of the ribs is provided with a slot intermediate the ends of the rib, e. g. at the center of the rib, which is of substantially the same width as the width of the pole sections which are then introduced individually and successively into the slot until they are in alignment with and can be slid along and interlocked with the rib. When all pole sections have thus been put in place on each rib, the slot is then closed by a removable filling piece. The pole coils are mounted on the rotor before the pole sections are assembled on the ribs.

These and other objects and advantages inherent in the invention will become more apparent from the following detailed description of an exemplary embodiment of the invention when considered with the accompanying drawings.

Fig. 1 is a view in longitudinal vertical section of a portion of a rotor constructed in accordance with the invention; and Fig. 2 is a view in transverse section taken on line 2—2 of Fig. 1.

With reference now to the drawings, the individual parts of each salient pole on the rotor comprise a plurality of solid cast or forged steel, axially short, claw-shaped sections $a$ which form the pole shoe proper and part of the pole core $k$. The pole coil is designated by reference character $b$ and this coil is mounted on the rotor $p$ before assembling the pole sections $a$ to form the salient poles of the machine. The claw-shaped pole sections $a$ are anchored to the body $p$ of the rotor by providing the latter with longitudinally extending ribs $i$ corresponding in number to the number of salient poles to be provided. Each of these ribs $i$ is undercut or otherwise arranged so as to make a sliding, interlocking fit with the plurality of pole sections $a$ that make up each of the salient poles on the machine. In the embodiment illustrated, it will be seen that the ribs $i$ have a transverse configuration corresponding generally to that of the interior opening of the claw-shaped sections $a$. Consequently the sections $a$ may be slid into position on the ribs $i$ but the interlocking therebetween due to co-engaging shoulder portions thereof prevents any possible movement of the pole sections $a$ in a radial direction when the rotor is rotated.

In order to assemble the pole sections $a$ on the ribs $i$ it will be seen from Fig. 1 that each of the ribs is provided intermediate its ends with a transverse slot $c$. This slot can be located, if desired, at the center, longitudinally speaking, of the rib but this is not essential to the invention. The slot $c$ is made as wide as the width of the pole sections $a$ in order that the latter may be introduced in succession into the same and brought into alignment with the rib, and thereafter slid along the rib, interlocking with the rib, until the rib is completely filled except for the slot $c$. The slot $c$ is then filled with a pair of outer filling pieces $d$ each having a nose portion $n$ that engages an internal transverse shoulder portion in the slot $c$. The filling pieces $d$ are spaced parallel from each other by means of a further central filling plate $e$ having opposed transverse keyways that correspond positionwise with keyways in the filling plates $d$, and keys or wedges $f$ are then inserted in the aligned keyways in order to anchor all of the filling pieces $d$ and $e$ in the slots c of the ribs i. For securing the filling pieces d and e, as well as the pole sections a against any displacement in a circumferential direction, bolts g are provided which extend longitudinally of the ribs i through aligned bores in the pole sections a and the filling pieces d and e.

The endmost pole sections a, i. e. those at the opposite ends of the rotor, which are required to withstand additional centrifugal forces attributable to the front coil copper are preferably provided with screws h which pass through the pole sections into the body of the rib i to transfer those forces to the ribs i.

The above described rotor and salient pole construction is extremely favorable as far as mechanical stress is concerned. This has the effect that in synchromachines, where the speed can be freely selected, for example, phase compensators, synchromotors for driving compressors over gears, it is now possible to work with a higher speed than before. With the new construction the maximum admissible speed of a phase compensator can be increased for example by 50%. This results in considerable savings in the weight of the rotor as well as in a reduction of the manufacturing costs of the whole machine. Besides, the special design of the claw connection reduces the cross section of the rotor body. Consequently one obtains a much greater moment of inertia for the rotor body, and the shaft ends of the rotor can also be made much thicker so that it is possible to make 4- and 6-pole-machines with considerably larger iron lengths without getting into trouble with the critical speed. This means a power increase of the same order. In synchromotors for drives with transmission gears, savings are not only made on the motor, but also on the gear, since the transmission gear can be made smaller due to the higher speed of the motor. In case a pole shoe has to be replaced, this can be done very easily by removing the filling pieces and pole parts.

I claim:

1. In a dynamo-electric machine, a rotor body having a plurality of longitudinally extending radial ribs which constitute part of the core portions of salient poles provided on the rotor, each of said ribs being provided intermediate its ends with a transverse slot, a plurality of claw-shaped pole sections for each rib having a width generally corresponding to that of said slot in the rib so as to be received in said slot and slid along and interlocked with said rib, and filling piece means filling each said slot after all of the pole sections have been mounted on said ribs, last said means comprising two outer filling pieces each provided with an outer face having a nose-shaped projection engaging a corresponding shouldered portion of said slot and a central filling piece separating said outer filling pieces and engaging the inner faces of the latter, the adjacent faces of said outer and central filling pieces being provided with aligned transverse recesses constituting keyways, and keys inserted respectively in said keyways for securing said filling pieces in said slot.

2. A rotor body as defined in claim 1 wherein the endmost located pole sections include screws extending therethrough into the rib for additional strength against centrifugal stresses.

References Cited in the file of this patent

UNITED STATES PATENTS 2,736,829    Sills    Feb. 28, 1956

FOREIGN PATENTS 104,183    Switzerland    Apr. 1, 1924